(12) United States Patent
Dietl (10) Patent No.: US 7,783,885 B2
(45) Date of Patent: Aug. 24, 2010

(54) HYBRID DIGITAL SIGNATURE WORKFLOW

(75) Inventor: Josef Dietl, Nussloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1054 days.

(21) Appl. No.: 10/675,930

(22) Filed: Sep. 29, 2003

(65) Prior Publication Data

US 2004/0128612 A1 Jul. 1, 2004

(30) Foreign Application Priority Data

Oct. 9, 2002 (EP) .................................. 02022621

(51) Int. Cl.
*H04L 9/32* (2006.01)
(52) U.S. Cl. ................. 713/176; 382/306; 283/113; 705/75
(58) Field of Classification Search ................. 713/176; 286/113; 705/75
See application file for complete search history.

(56) References Cited

U.S. PATENT DOCUMENTS

| | | | |
|---|---|---|---|
| 5,748,783 A * | 5/1998 | Rhoads ........................ 382/232 |
| 6,634,559 B2 * | 10/2003 | Shioda et al. ................. 235/487 |
| 6,675,153 B1 * | 1/2004 | Cook et al. .................... 705/74 |
| 6,853,987 B1 * | 2/2005 | Cook ............................. 705/75 |
| 6,981,151 B1 * | 12/2005 | Groeneveld et al. ......... 713/193 |
| 7,069,250 B2 * | 6/2006 | Meadow et al. ............... 705/75 |
| 7,089,214 B2 * | 8/2006 | Wang ........................... 705/64 |
| 7,260,380 B2 | 8/2007 | Dietl et al. |
| 7,340,718 B2 | 3/2008 | Szladovics et al. |
| 7,546,334 B2 * | 6/2009 | Redlich et al. ............... 709/201 |
| 2002/0069179 A1 * | 6/2002 | Slater et al. .................... 705/67 |
| 2002/0138441 A1 * | 9/2002 | Lopatic ........................ 705/59 |
| 2004/0123273 A1 | 6/2004 | Hammerich et al. |
| 2004/0128612 A1 * | 7/2004 | Dietl ........................... 715/500 |
| 2004/0143627 A1 | 7/2004 | Dietl |
| 2004/0193543 A1 * | 9/2004 | Nord et al. ..................... 705/50 |
| 2004/0223009 A1 | 11/2004 | Szladovics et al. |
| 2004/0264811 A1 * | 12/2004 | Yano et al. ................... 382/306 |
| 2005/0020308 A1 * | 1/2005 | Lai ............................. 455/558 |
| 2005/0021537 A1 | 1/2005 | Brendle et al. |
| 2005/0021557 A1 | 1/2005 | Brendle et al. |
| 2005/0022163 A1 | 1/2005 | Brendle et al. |
| 2005/0071785 A1 | 3/2005 | Chadzelek et al. |
| 2005/0091276 A1 | 4/2005 | Brunswig et al. |
| 2005/0132195 A1 | 6/2005 | Dietl |
| 2005/0132196 A1 | 6/2005 | Dietl |
| 2005/0136979 A1 | 6/2005 | Dietl et al. |
| 2006/0150075 A1 | 7/2006 | Dietl et al. |

(Continued)

OTHER PUBLICATIONS

Canonical XML, Version 1.0, W3C Recommendation Mar. 15, 2001.*

(Continued)

*Primary Examiner*—Farid Homayounmehr
(74) *Attorney, Agent, or Firm*—Fish & Richardson P.C.

(57) ABSTRACT

Methods and apparatus, including computer program products, for processing documents in a workflow system with users external to the system.

An electronic document is generated in a workflow system. The electronic document has content and a document appearance, where the appearance represents the content. One or more control codes are generated for the electronic document as part of a workflow in the workflow system, where the control codes are usable to validate the content. A print out including the document appearance and the one or more control codes is created.

15 Claims, 5 Drawing Sheets

U.S. PATENT DOCUMENTS

2006/0150084 A1    7/2006   Dietl et al.
2006/0150110 A1    7/2006   Dietl et al.
2006/0156006 A1*   7/2006   Dietl et al. .................. 713/176
2006/0248538 A1   11/2006   Dietl et al.
2007/0277042 A1   11/2007   Dietl 2008/0022111 A1    1/2008   Dietl

OTHER PUBLICATIONS

Converting XML to its canonical form.*

* cited by examiner

HYBRID DIGITAL SIGNATURE WORKFLOW

CROSS-REFERENCE TO RELATED APPLICATIONS

This application claims the benefit of priority to European application serial no. 02022621.3, filed Oct. 9, 2002.

BACKGROUND OF THE INVENTION

The present invention relates to handling document processing in a computer system.

Business processes within enterprises are often controlled using workflow systems. Within a workflow system a number of business processes can be controlled such as human resources, finance, purchases, sales, production, and planning.

Business processes within a workflow system are typically implemented using workflows. A workflow defines a particular sequence of steps that are required to complete a specific business purpose. For example, an electronic document generated within a workflow system might require that the document be approved by a number of individuals before being sent to an external entity. A workflow associated with the document in the workflow system would route the document to the necessary individuals for approval, and track the document being routed through the business entity. If the external entity receiving the document uses a workflow system that can communicate directly with the workflow system generating the document, the workflow system can send the document directly to the external entity after all the required approvals have been obtained. All of these steps can be performed very efficiently using a workflow system because the document is automatically routed through the workflow system to each step required by the business process.

Such systems are less efficient when the workflow system has to interact with external entities, i.e., entities that cannot communicate directly with the workflow system. For example, when the external entity is a private person or a small business, it may be necessary to send a print out of a document to the external entity because the external entity cannot receive documents directly from the workflow system. Such an interaction may require that the individuals required to approve the document affix their physical signatures to the document before the document can be sent to the external entity.

SUMMARY OF THE INVENTION

In general, in one aspect, the invention provides methods and apparatus, including computer program products, for processing documents using a computer system. The techniques include generating an electronic document in a workflow system, generating one or more control codes for the electronic document as part of a workflow in the workflow system, and creating a print out of the electronic document. The required document has content and a document appearance, where the appearance represents the content. The control codes can be used to validate the content. The printout includes the document appearance and the control codes.

The electronic document has an associated approval code, and a human-readable approval mark can be generated for the approval code as part of a workflow in the workflow system. A control code that can be used to validate the approval mark can be generated and included in the print out. Generating the approval mark can include generating a digital signature as the approval code, and generating a signature image associated with the approval code. Generating one or more control codes can include generating a single control code for the print out. If the print out has one or more physical pages, one or more control codes can be generated, where each control code corresponds to a page of the print out. Generating the control codes can include converting the electronic document to a canonical form, and generating the control codes by encrypting the canonical form with a private key. The private key has an associated public key certificate for retrieving a public key associated with the private key. A workflow system can receive the print out having a subsequently added human signature and validate the received print out within the workflow system.

In another aspect, the invention provides methods and apparatus implementing techniques for receiving a print out of an electronic document generated in a workflow system, converting the print out to a canonical form, and accessing a portal of the workflow system to validate the print out. The print out has a document appearance and one or more control codes. The print out is validated using the canonical forms and the control codes.

Advantageous implementations of the invention include one or more of the following features. A control code for an approval mark can be received and the approval mark can be validated by accessing the portal of the workflow system.

In another aspect, the invention provides a workflow system including means for generating an electronic document having a content and a document appearance, means for generating one or more control codes that can be used to validate the content, and means for printing a print out including the document appearance and the one or more control codes. The workflow system includes a portal for validating the print out, where the validation is performed using a canonical form generated from the print out and the control codes.

The invention can be implemented to realize one or more of the following advantages. The method described in the invention improves the efficiency of a workflow system required to interact with an external entity that cannot communicate directly with the workflow system. The external entity can be an incompatible workflow system that cannot communicate directly with the workflow system generating the electronic document. One implementation of the invention provides all of the above advantages.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
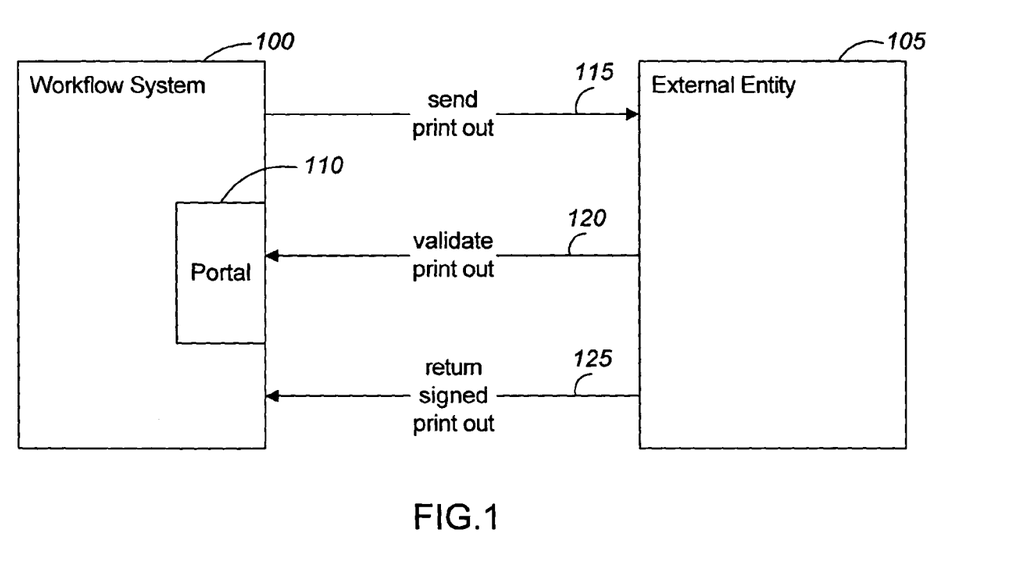
FIG. 1 is a flow diagram illustrating transactions between a workflow system and an external entity, according to one aspect of the invention.

FIG. 1 is a flow diagram illustrating transactions between a workflow system 100 and an external entity 105 according to one aspect of the invention. External entities 105 can include any entity that cannot exchange electronic documents with the workflow system 100 or any entity that cannot exchange electronic documents with the workflow system 100 in a secure manner. External entities 105 can also include any entity that cannot communicate directly with the workflow system 100 and/or cannot receive documents directly from the workflow system 100. In one implementation, a workflow in the workflow system 100 cannot automatically route a document to the external entity 105 for approval. The workflow system 100 transmits a print out of the document (step 115) to the external entity 105 for approval. In one implementation, the print out is a printed document generated from the electronic document. In another implementation, the print out is an electronic version of the printed document, e.g., one or more electronic images displaying pages of the printed document. The workflow system 100 includes a portal 110 that can optionally be used by the external entity to validate the print out (step 120). The external entity 105 can sign the print out and return it to the workflow system 100 (step 125).

Figure 2:
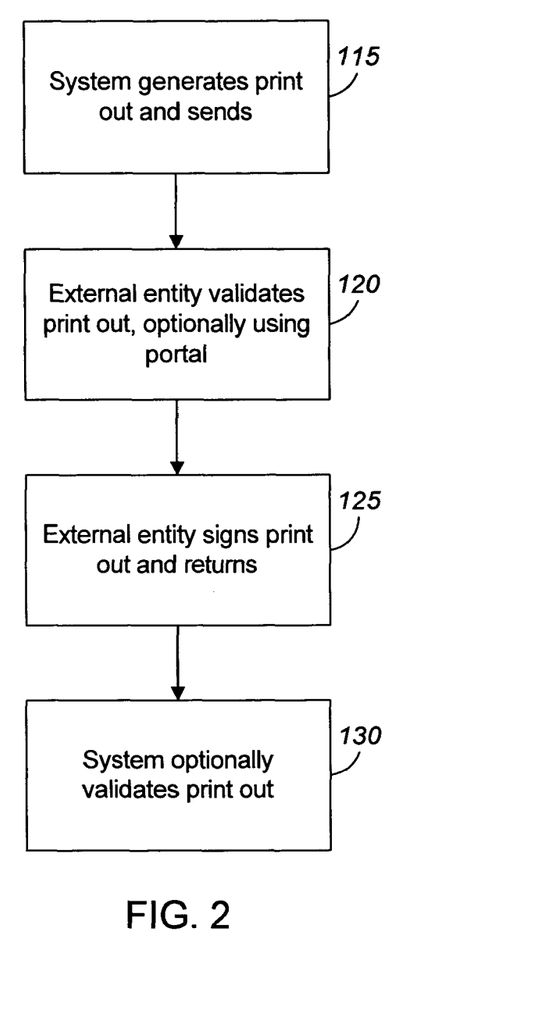
FIG. 2 is a flow diagram illustrating a method for exchanging documents between the workflow system and the external entity.

FIG. 2 illustrates a method for exchanging documents between the workflow system 100 and the external entity 105. The workflow system 100 generates a print out and sends it to the external entity 105 (step 115). The external entity 105 validates the print out, optionally using the portal 110 (step 120). The external entity 105 signs the print out and returns it to the workflow system 100 (step 125). The workflow system 100 optionally validates the print out received from the external entity 105 before further processing (step 130).

Figure 3:
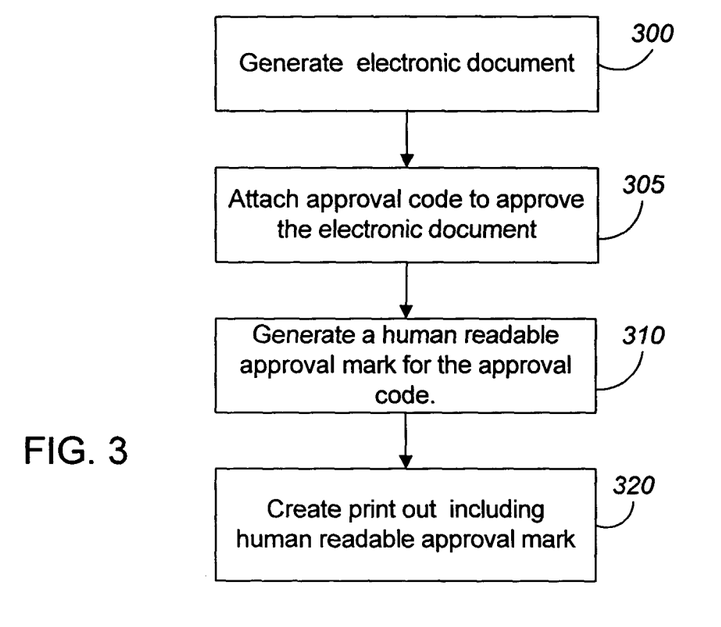
FIG. 3 is a flow diagram illustrating a method for generating a print out according to one aspect of the invention.

FIG. 3 illustrates a method for generating a print out according to one aspect of the invention. The method operates on an electronic document generated within a workflow system 100 (step 300). Individuals required to approve the electronic document in accordance with a workflow within the workflow system approve the document and attach their respective approval codes to the electronic document (step 305). When the print out is produced, each approval code is used to generate a human-readable approval mark (step 310). The approval mark corresponding to each approval code is affixed to the print out produced from the electronic document (step 320). The print out produced by step 320 can be routed to external entities 105, e.g., entities that cannot communicate directly with the workflow system 100, for further approval.

The approval code used to validate the electronic document in FIG. 3 can be a digital signature or a watermark. An authorized approver in the workflow system may approve the electronic document by attaching his personal digital signature to the electronic document. The approval code attached to the electronic document can be used to validate the content of the electronic document, as well as the identity of the approver, as the electronic document is routed through the workflow system to subsequent steps of the workflow process.

Figure 4:
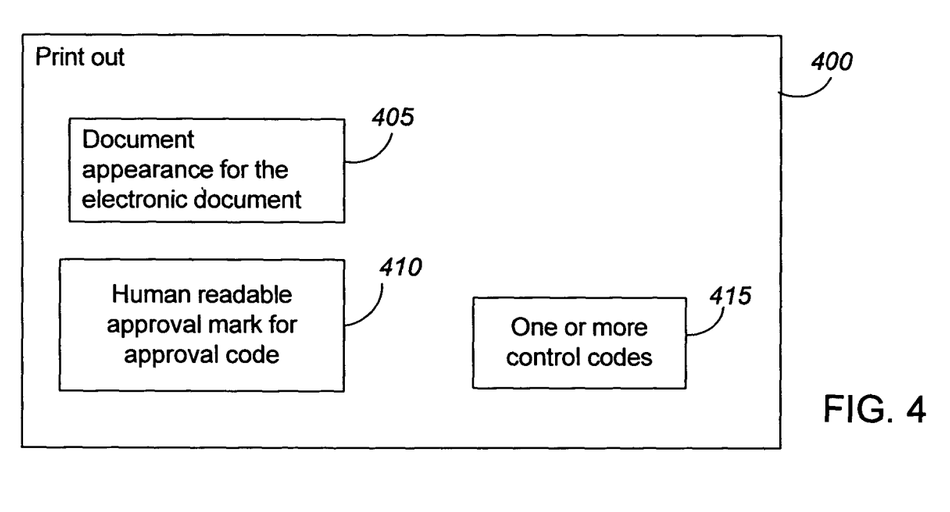
FIG. 4 is a block diagram of the elements of the print out generated from the digital document.

FIG. 4 is a block diagram of the elements of a print out 400 generated from an electronic document. The print out 400 includes a document appearance associated with the electronic document 405. The approval codes attached to the electronic document during the validation step (step 305, FIG. 3) are used by the workflow system to generate corresponding human-readable approval marks 410. In addition, one or more control codes 415 are generated within the workflow system and included in the print out 400. The control codes 415 can be used to authenticate the print out 400, by validating its content. In one implementation, one control code 415 is generated for the entire document. In an alternative implementation, a number of control codes 415 are generated, each control code 415 corresponding to a page of the print out 400. Authentication of the print out 400 can include validating the approval mark 410 and/or validating the content 405 of the document using the control codes 415. The print out 400 includes the approval mark 410 and the control codes 415. In one implementation, a control code 415 is generated for each page of the print out 400 and included in the corresponding page of the print out 400.

The approval mark 410 can consist of a signature image of the approver that is associated with the approval code attached to the digital document in step 305 (FIG. 3). Such a signature image may be stored in a repository within the workflow system 100 and retrieved when the print out 400 is produced.

The control code 415 affixed to the print out 400 can be a two dimensional bar code, a bar code, or a sequence of characters. The recipient of the print out 400 can validate the authenticity of the print out 400 using the control code 415. In one implementation, a unique control code 415 is generated for the approval code associated with the approval mark 410 and the control code 415 can be used to authenticate the approval mark 410. The contents of the print out 400 can be validated using another unique control code 415 that is generated based on the contents of the print out 400. In one implementation, only one control code 415 is generated for the electronic document. In an alternative implementation, a number of control codes 415 are generated, each control code 415 corresponding to a page of the print out 400.

Figure 5:
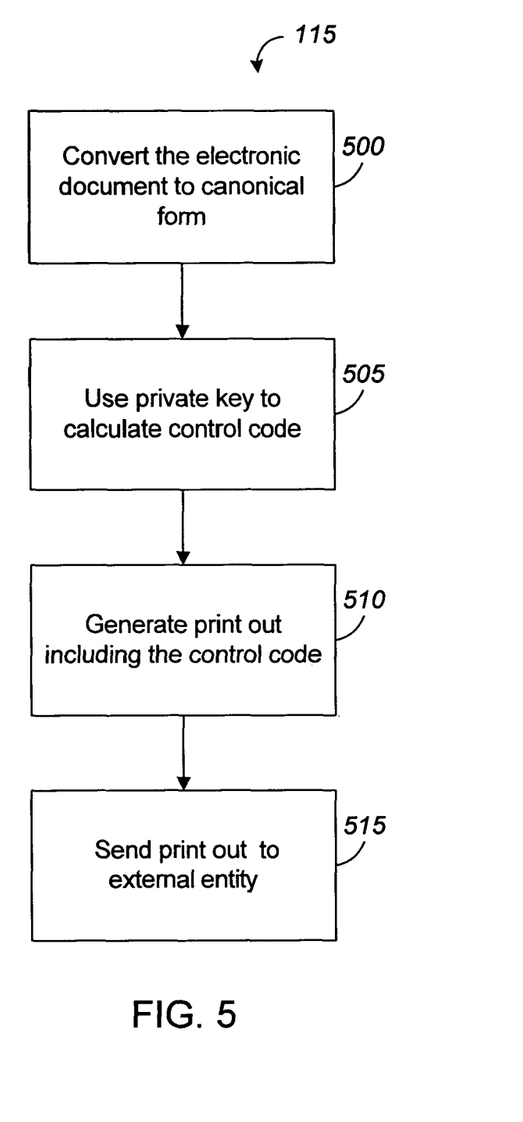
FIG. 5 is a flow diagram illustrating an exemplary method for generating the print out including control codes.

FIG. 5 illustrates a method for generating the control codes included in the print out in accordance with step 115 (FIG. 1). The workflow system 100 converts the electronic document to a canonical form (step 500). Converting the electronic document to the canonical form can include deleting all invisible characters in the electronic document, e.g., control characters, or white space at the end of a line. Converting the electronic document to the canonical form can also include replacing all white spaces in the electronic document, e.g., tabs and multiple white spaces, with a single white space character. The workflow system 100 calculates the control code 415 for the electronic document by encrypting the canonical form using a private key (step 505), generates a print out 400 including the control code 415 (step 510), and sends the print out 400 to the external entity 105 (step 515). The control code 415 can be a digital signature function of the text in the canonical form of the electronic document. In one implementation, the workflow system 100 generates one control code 415 using the canonical form for the electronic document. In an alternative implementation, a number of control codes 415 are generated, each control code 415 corresponding to the canonical form for individual pages of the electronic document.

Figure 6:
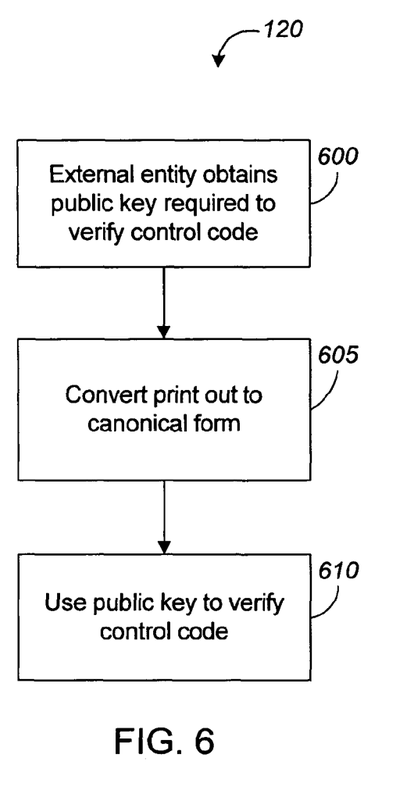
FIG. 6 is a flow diagram illustrating an exemplary method used by the external entity to validate the print out received from the workflow system.

FIG. 6 illustrates a method that can be used by the external entity 105 to validate the print out 400 (FIG. 4) received from the workflow system 100 (step 120, FIG. 1). The external entity obtains a public key required to verify the control code 415 (FIG. 4) included in the print out 400 (step 600). In one implementation, the workflow system 100 transmits the print out 400 electronically to the external entity 105 along with a digital certificate including the public key. In an alternative implementation, the external entity 105 retrieves the public key from the portal 110 (FIG. 1), or from a trusted third party. The external entity 105 converts the text in the print out 400 to a canonical form (step 605). Converting the print out 400 to a canonical form can include replacing all white spaces, e.g., tabs and multiple white spaces, with a single white space character. The external entity uses the canonical form of the print out 400 and the public key obtained in step 600 to verify the control codes 415 for the print out (step 610). In one implementation, the external entity verifies the control codes 415 without obtaining a public key by accessing the portal and using the canonical form of the print out. If the print out 400 has a control code 415 for each page of the print out 400, the external entity 105 validates each page of the print out 400 using the corresponding control code 415. In order to verify the control code 415 using the public key the external entity 105 must obtain the character map used by the workflow system 100 to generate the control code 415, and the text must have an unambiguous reading order for generating the control code 415. In one implementation, the print out 400 includes or identifies the character map used by the workflow system 100 to generate the control code 415. In an alternative implementation, the external entity 105 obtains the character map from the portal 110 or from a third party. The unambiguous reading order used for generating and validating the control code 415 can be any reading order that is used by both the workflow system 100 and the external entity 105.

Figure 7:
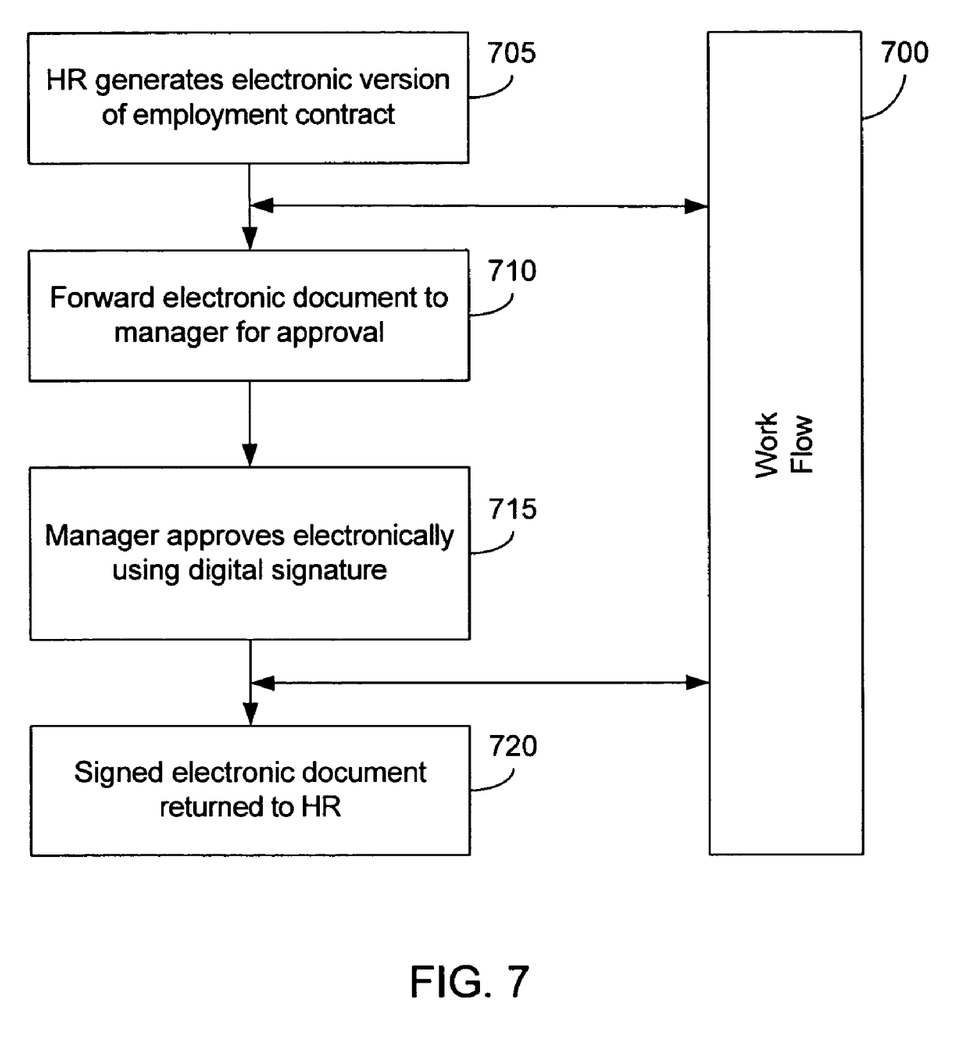
FIG. 7 illustrates an example of using the described method to prepare an employment contract.

FIG. 7 illustrates an example of using the described method to prepare an employment contract. The workflow system 100 used in this example is an enterprise resource planning system (ERP). A workflow 700 within the ERP system defines the sequence of steps that must be performed to prepare the employment contract. First, an electronic version of the employment contract is prepared by the human resources (HR) department (step 705). The workflow step for the HR department, within the ERP system, forwards the electronic version of the employment contract to the relevant manager for approval (step 710). The manager receives the employment contract in electronic form and approves it within the workflow system by attaching his personal digital signature as an approval code (step 715). The validated digital employment contract is routed by the workflow system back to the HR department (step 720).

Figure 8:
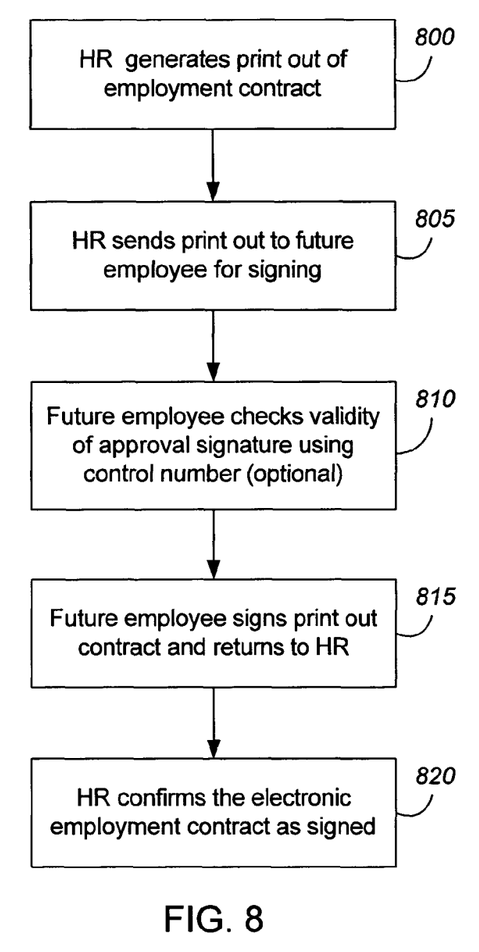
FIG. 8 shows the additional steps required to prepare the employment contract using the method described in the invention.

FIG. 8 shows an example of the additional steps required to prepare the employment contract using the method described in the invention. In a workflow step within the HR department, the HR department produces a print out 400 (FIG. 4) of the validated electronic employment contract (step 800). The print out 400 includes the contents of the employment contract 405 (FIG. 4), a human-readable approval mark 410 (FIG. 4) consisting of the printed signature of the approver, and a control code 415 (FIG. 4). The control code 415 can be used by the recipient to validate the authenticity of the approval mark 410. In addition, the control codes 415 can be printed on each page of the print out 400 and used to authenticate the contents of the corresponding page. Alternatively, a control code 415 generated for the entire print out 400 can be used to authenticate the contents of the print out 400.

The HR department sends the print out 400 (FIG. 4) of the employment contract to the future employee for signature (step 805). The future employee can validate the authenticity of the human-readable approval signature using the corresponding control code 415 (FIG. 4) (step 810). The future employee signs the print out 400 of the employment contract and returns the signed print out 400 to the HR department (step 815). The HR department then confirms the electronic employment contract as signed within the ERP system and proceeds with the workflow accordingly (step 820).

The invention is not limited to the implementation shown in the example within the context of a workflow system 100. The invention can be implemented in any computer system or computer landscape that supports the processing of business processes. The invention can be implemented in a computer system using a computer implemented word processor to generate the text file. Text and macros within the word processor can be used to perform the tasks of generating the approval code, the human-readable approval mark, and the control code.

An electronic document does not necessarily correspond to a file. A document may be stored in a portion of a file that holds other documents, in a single file dedicated to the document in question, or in multiple coordinated files.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer implemented method executed in a workflow system as part of a workflow within the workflow system, comprising:

generating an electronic document in a workflow system for use with an external entity that does not exchange electronic documents with the workflow system, the electronic document having text content, the electronic document further having a human-readable document appearance representing the text content;

attaching one or more approval codes to the electronic document, such that when the document is printed, each approval code generates a unique approval mark;

converting the text content into a canonical form, wherein the text content is in an unambiguous reading order;

generating control codes for the electronic document as part of a workflow in the workflow system, the control codes including one or more first control codes that each correspond to a respective approval code, wherein the one or more first control codes authenticate the approval mark associated with the respective approval code, and one or more second control codes generated from the canonical form of the text content, wherein the one or more second control codes authenticate the text content and wherein the canonical form of the text is encrypted with a private key, the private key having an associated public key certificate for retrieving a public key associated with the private key; and creating a print out of the electronic document, the print out having two or more physical pages and including:
a full-sized version of the human-readable document appearance representing the text content,
the unique approval mark corresponding to each of the one or more approval codes,
the one or more first control codes being usable to authenticate one or more respective approval marks, and
the second control codes being usable to validate the text content of the print out, each second control code corresponding to the text content on a page of the two or more physical pages of the print out, each page of the print out having a unique second control code corresponding to the text content on the page;

sending the print out to the external entity;

receiving a modified print out at the workflow system back from the external entity, the modified print out comprising the print out sent to the external entity with a modification;

validating the modified print out within the workflow system using the one or more control codes;

integrating the validated and modified print out into the workflow; and continuing the workflow for the validated print out within the workflow system.

2. The method of claim 1, wherein generating the approval mark comprises:
generating a digital signature as the approval code; and
generating a signature image associated with the approval code.

3. The method of claim 1, wherein generating one or more second control codes comprises:
generating a single second control code for all of the text content.

4. The computer implemented method of claim 1, wherein the modified print out comprises the print out sent to the external entity and a subsequently added human signature.

5. The computer implemented method of claim 1, wherein generating an electronic document in a workflow system comprises routing the electronic document to one or more workflow locations; and wherein attaching one or more approval codes to the electronic document comprises verifying the content of the electronic document at each of the one or more workflow locations.

6. The computer implemented method of claim 1, wherein the one or more approval codes authenticate the text content of the electronic document and identify one or more approvers associated with the approval codes.

7. The computer implemented method of claim 1, wherein the print out comprises a barcode representation of the one or more first control codes and the one or more second control codes.

8. A computer program product, tangibly embodied in a machine-readable storage device, comprising instructions operable to cause a programmable processor to:

receive a print out of an electronic document having text content generated in a workflow system, the print out being received in an external entity that does not exchange electronic documents with the workflow system, the print out having two or more physical pages and including:
a full-size, human-readable document appearance representing the text content, the text content having an unambiguous reading order, and
control codes and one or more approval marks, the control codes including one or more first control codes each corresponding to a unique approval mark, the one or more first control codes generated from an approval code and being usable to authenticate the approval marks generated by the approval code, and two or more second control codes generated from a canonical form of the text content, each page of the two or more physical pages having a unique second control code;

receive a public key from the workflow system, the public key used to verify the one or more second control codes;

receive a character map from the workflow system used by the workflow to generate the one or more second control codes;

convert the text content of the human-readable appearance of the print out to the canonical form of the text content using the character map received from the workflow system; and access a portal of the workflow system to authenticate the approval marks and to validate the print out using the canonical form and the first and second control codes.

9. The computer program product of claim 8, wherein the print out comprises a barcode representation of the one or more first control codes and the one or more second control codes.

10. A computer program product, tangibly embodied in a machine-readable storage device, comprising instructions operable to cause a processor to:

generate an electronic document in a workflow system as part of a workflow, the electronic document being for use with an external entity that does not exchange documents with the workflow system, the electronic document having text content, the electronic document further having a human-readable document appearance representing the text content;

attach one or more unique approval codes to the electronic document, such that when the document is printed, each approval code generates a unique approval mark;

convert the text content into a canonical form, wherein the text content is in an unambiguous reading order;

generate control codes for the electronic document as part of a workflow in the workflow system, the control codes including one or more first control codes that each correspond to a respective approval code, wherein the one or more first control codes authenticate the approval mark associated with the respective approval code, and one or more second control codes generated from the canonical form of the text content, wherein the one or more second control codes authenticate the text content and wherein the canonical form of the text is encrypted with a private key, the private key having an associated public key certificate for retrieving a public key associated with the private key; and create a print out of the electronic document, the print out having two or more physical pages and including:
  a full-sized version of the human-readable document appearance representing the text content,
  the unique approval mark corresponding to each of the one or more approval codes,
  the one or more first control codes usable to authenticate one or more respective approval marks, and
  the second control codes usable to validate the text content of the print out, each second control code corresponding to the text content on a page of the two or more physical pages of the print out, each page of the print out having a unique second control code corresponding to the text content on the page;

send the print out to an external entity;

receive the print out at the workflow system from the external entity, the print out comprising a human signature added subsequent to sending the print out to the external entity;

validate the print out comprising the human signature within the workflow system using the one or more control codes;

integrate the validated print out comprising the human signature into the workflow; and continue the workflow for the validated print out within the workflow system.

11. The computer program product of claim 10, wherein the instructions to generate the approval code cause the data processing equipment to:
  generate a digital signature as the approval code; and
  generate a signature image associated with the approval code.

12. The computer program product of claim 10, wherein the instructions to generate the one or more second control codes cause the data processing equipment to:
  generate a single second control code for all of the text content.

13. The computer program product of claim 10, wherein the print out has two or more physical pages, and the instructions to generate the one or more second control codes cause the data processing equipment to:
  generate one or more second control codes, each second control code corresponding to the text content on a page of the one or more physical pages.

14. computer program product of claim 10, wherein the instructions to generate the one or more control codes cause the data processing equipment to:
  encrypt the canonical form with a private key, the private key having an associated public key certificate for retrieving a public key associated with the private key.

15. The computer program product of claim 10, wherein the print out comprises a barcode representation of the one or more first control codes and the one or more second control codes.

* * * * *